United States Patent [19]

Sbicca

[11] 4,218,797
[45] Aug. 26, 1980

[54] METHOD OF MAKING FOOTWEAR

[76] Inventor: Peter J. Sbicca, 289 Lorain Rd., San Marino, Calif. 91108

[21] Appl. No.: 9,461

[22] Filed: Feb. 5, 1979

[51] Int. Cl.² .......................... A43D 9/00; A43B 5/00
[52] U.S. Cl. .................................. 12/142 EV; 36/135
[58] Field of Search ........................... 36/135, 4, 7.3; 12/142 R, 142 E, 142 EV, 145

[56] References Cited

U.S. PATENT DOCUMENTS

| 1,958,107 | 5/1934 | Merrill et al. | 36/135 |
| 3,858,336 | 1/1975 | Brown | 36/135 |
| 3,987,510 | 10/1976 | Sbicca | 12/142 EV |

*Primary Examiner*—Patrick D. Lawson
*Attorney, Agent, or Firm*—Sellers and Brace

[57] ABSTRACT

A method of making footwear having an upper the lower edge of which is embedded in a sole of elastomeric composition compounded to set in a mold cavity at room temperature and pressure. The upper comprises a loop of elastic fabric stretched to embrace the perimeter of a male mold with one edge curled inwardly and impaled over pointed pins supported on a male mold and some of which pins act to hold the two mold members properly spaced apart while the elastomer cures.

12 Claims, 7 Drawing Figures

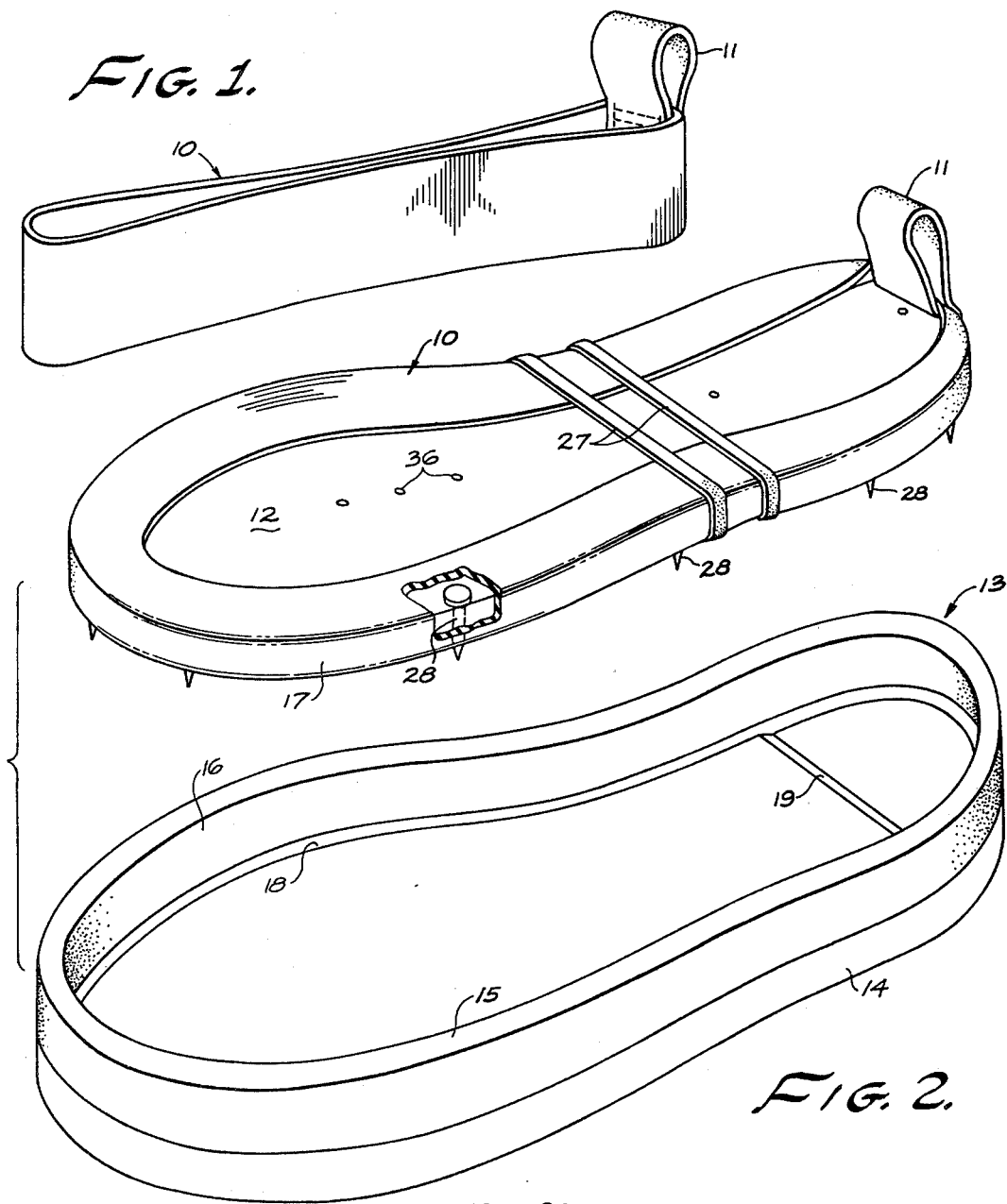
FIG. 1.
FIG. 2.
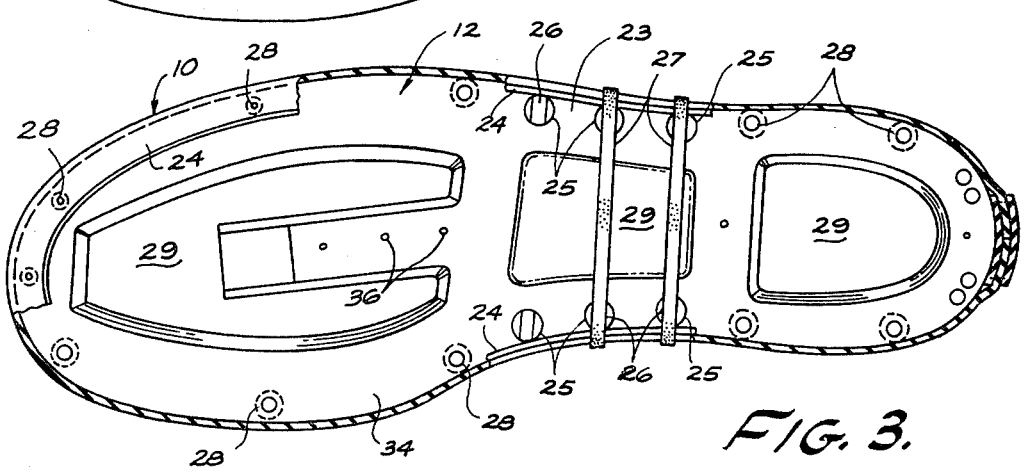
FIG. 3.

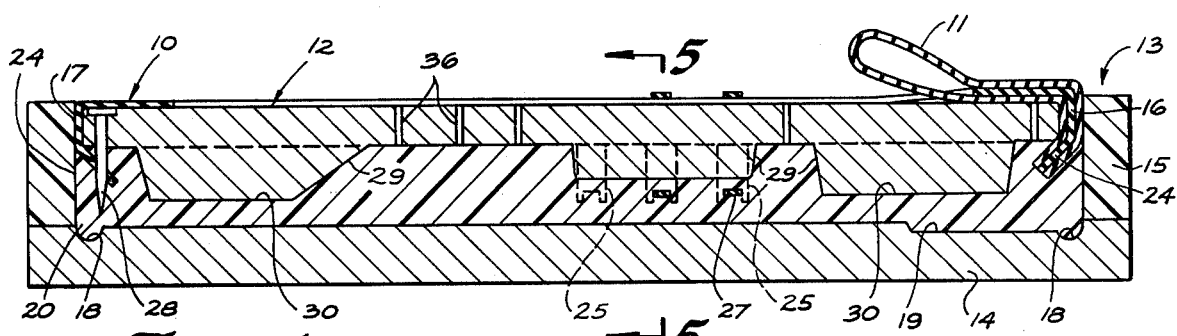
FIG. 4.
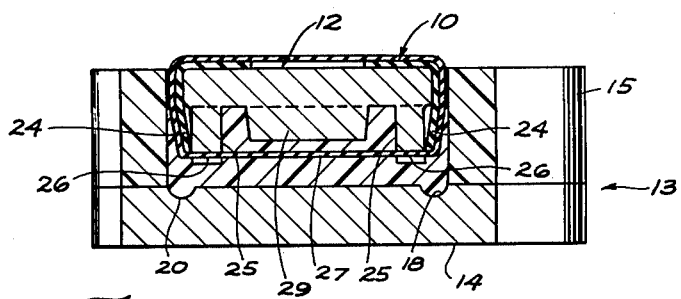
FIG. 5.   FIG. 6.
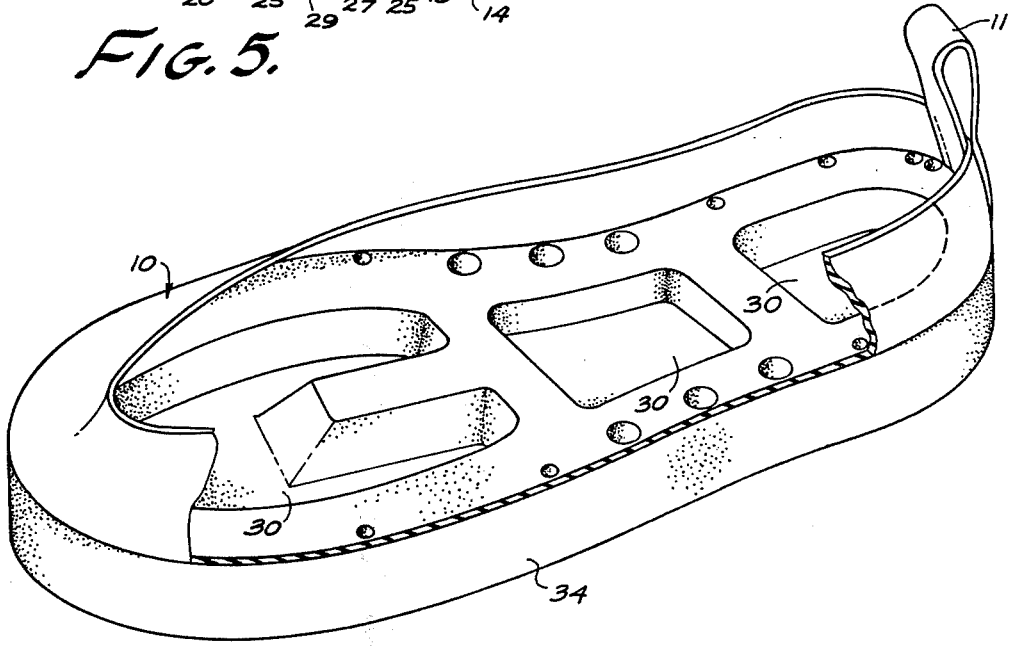
FIG. 7.
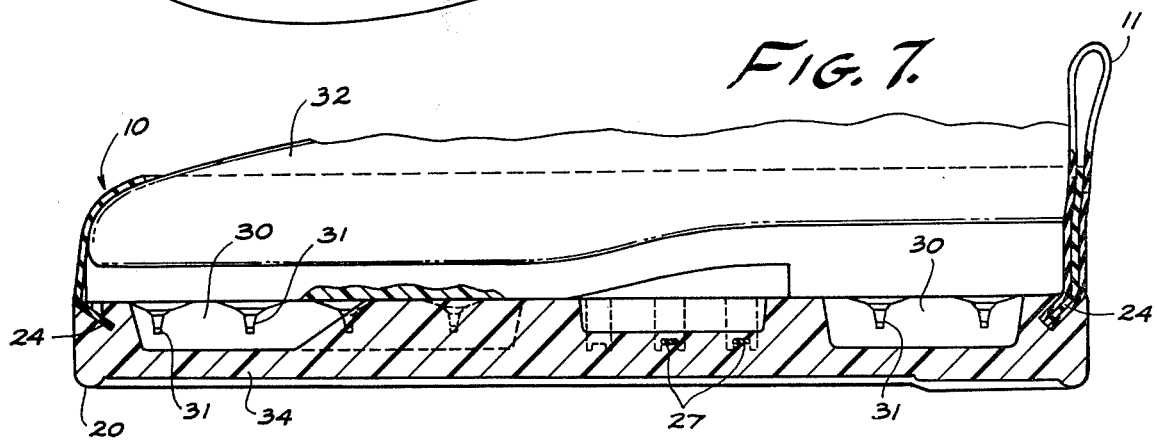

METHOD OF MAKING FOOTWEAR

This invention relates to footwear, and more particularly to an improved and economical method of making a range of footwear sizes with a minimum number of two part molds for inseparably anchoring an elastic upper to an elastomeric sole at room temperature and pressure.

This invention comprises certain improvements and modifications in the method of making footwear disclosed in my U.S. Pat. No. 3,987,510 granted Oct. 26, 1976. In carrying out my former method it was found expedient to employ a female mold cavity providing a small but definite clearance between its inner sidewall and the adjacent lower edge of an elastic upper snugly embracing a male mold member. This avoided the risk of displacing an upper frictionally assembled about the male mold member during assembly of the two molds and was accompanied by the disadvantage that the clearance gap could vary very substantially along the perimeter of the mold. The resulting varying protrusion of the sole beyond the exterior sides of the upper not only was unsightly but suggested poor and unskilled workmanship. Furthermore and despite this clearance, not infrequently the upper became displaced during the mold assembly operation so that the lower edge of the upper extended non-uniformly into the mold cavity resulting in a weak joint between the sole and the upper and an unsaleable product. Another shortcoming of my prior method involved poor and unreliable anchorage of the upper along shank portions of the outsole. This was due to the fact that the width of the shank is customarily narrower than the portions of the footwear to either end of the shank. Accordingly stretching of the elastic upper over the male mold left portions of the upper along the sides of the shank uncurled and spaced outwardly away from the shank of the male mold member. In consequence these portions of the upper were not less firmly and uniformly anchored in the outsole as other portions of the upper.

The foregoing and other shortcomings of prior practice are avoided by the present invention. These results are achieved by providing the molding face of the male mold member with a plurality of sharp spacing and anchoring pins positioned at strategic points therealong for the impalement thereover of the lower edge of the upper and the anchorage thereof in the outsole as the latter cures. At least some of the anchor pins are sufficiently long to space the two molds at the proper distance apart to form the outsole mold cavity. The proper positioning and inward curling of the shank portions of the upper is accomplished by bosses projecting from the molding face of the mold member supporting elastic bands encircling the shank of the male mold. These are quickly assembled and positioned after other portions of the upper have been impaled over the anchor pins and cooperate with these pins in holding the entire lower perimeter of the upper properly curled toward but spaced from the molding surface of the male mold. After removal of the footwear from the mold the portion of the bands not embedded in the sole are clipped away and discarded. The footwear may be formed with upwardly opening recesses on the interior of the sole to accommodate spiked shoes and the like types of athletic footwear or the interior surface of the sole may be provided with a generally flat surface and worn as a slipper or a shoe.

Accordingly, it is a primary object of this invention to provide an improved and less costly method of making footwear comprised essentially of an elastic fabric upper molded to an elastomeric sole.

Another object of the invention is the provision of an improved method of making footwear using two simple mold components to one of which an elastic upper can be assembled and firmly anchored with its lower edge curled inwardly and held spaced from the molding face of the mold cavity.

Another object of the invention is the provision of an improved method of molding an upper to an outsole with the lateral edges of the shank portion held curled inwardly and spaced from the mold cavity surfaces by elastic band means.

These and other more specific objects will appear upon reading the following specification and claims and upon considering in connection therewith the attached drawing to which they relate.

Referring now to the drawing in which a preferred embodiment of the invention is illustrated.

FIG. 1 is a perspective view of the elastic upper in readiness for assembly to a male mold;

FIG. 2 is an exploded perspective view showing the upper assembled to the male mold and overlying in readiness for assembly to the female mold;

FIG. 3 is a plan view of the upper mold member and upper sub-assembly as shown in FIG. 2 with portions of the inwardly curled upper broken away;

FIG. 4 is a longitudinal cross sectional view of the assembled mold charged with elastomer;

FIG. 5 is a cross sectional view taken along line 5—5 on FIG. 4;

FIG. 6 is a perspective view of the footwear after removal from the mold and showing a portion of the upper broken away to reveal internal structural details of the outsole; and FIG. 7 is a generally longitudinal cross sectional view taken generally along the longitudinal center line of FIG. 6.

Referring initially more particularly to FIGS. 1 to 3, there is shown a continuous loop of elastic fabric 10 suitable for forming a low height upper of an article of footwear suitable for wear over a spiked golf shoe. The ends of loop 10 are securely joined together beneath the ends of a finger loop 11. The preassembly relaxed length of loop 10 is substantially less than the perimeter of the male mold member 12.

FIG. 2 shows upper 10 stretched and assembled to mold 12 in readiness for insertion into the top of the female mold 13. The latter has a rigid base 14 to which is securely anchored a resilient sidewall 15 of elastomeric material. The interior surface 16 of wall 15 is shaped and sized to have a snug frictional fit with the adjacent strip 17 of upper 10. The bottom of female mold 14 is preferably provided with a groove 18 along the base of sidewall 15 as well as a heel-forming depression 19 at its rear end. Groove 18 provides a bead along the perimeter of the sole of the finished article of footwear and cooperates with any suitable irregular surface pattern molded into the outer surface of the sole in resisting skid of the footwear on wet surfaces.

Structural features of the male mold 20 are best shown in FIGS. 3 to 5. This elongated rigid member is shaped to form the interior of footwear adapted to be worn over athletic type shoes or to be worn directly on the foot of the wearer. The mid-length or shank portion 23 (FIG. 3) is convex along its opposite sides in accordance with conventional footwear construction. For this reason the juxtaposed portions of the stretched elastic upper 10 are spaced outwardly away from the side edges of the shank portion of mold member 12 and the lowermost edges are not curled inwardly as they must be for proper embedment in the sole of the footwear. To overcome this problem and to expedite and facilitate the assembly of mold members 12 and 13, male mold 12 is provided with three bosses 25 along the opposite sides of its shank. The outer end of each boss is provided with a shallow transverse groove 26 to seat a rubber band 27. At least two and preferably three of these bands encircle the shank of the male mold and serve to compress the underlying portions of the elastic upper 10 and hold it snugly against the opposite sides of the male member shank. Importantly, the bands hold the adjacent edges 24 of the upper curled inwardly toward but spaced from the molding surface of the upper mold. It will therefore be recognized that the sharp pointed pins 28 cooperate with the rubber bands in holding the entire periphery of loop 10 curled inwardly and in position for all portions thereof to be intimately embedded in and bonded to the elastomeric sole material.

As herein shown, the male mold 12 is also provided on its lower or molding surface with a plurality of bosses 29 shaped to form recesses 30, 30 to receive the spikes or projections of typical athletic shoes, such as the spikes 31 of the golf shoe 32 shown in FIG. 7.

The method steps employed in the manufacture of the invention footwear will be readily apparent from the foregoing description of the two mold components. The forward end of the elastic upper 10 is assembled over the toe end of male member 12 following which the heel end is applied over the rear end of the mold. This assembly operation is carried out so that only a narrow portion 24 of the upper protrudes beyond the lower or molding face of the mold. Owing to the considerable stretching of the upper both of its projecting edges curl inwardly. The lower protruding edge 24 is then impaled over pins 28 following which three rubber bands 27 are stretched into position about the shank and seated in notches 26 of bosses 25. An adequate charge of fluent elastomeric composition is then poured into the open male mold cavity under room temperature and atmospheric pressure conditions. The male mold sub-assembly is then inserted into the top of the female mold 13 after the latter has been charged with a sufficient quantity of uncured fluent elastomeric material to form the sole 34. Air escapes to the atmosphere through the vent holes 36 through various ports of the male mold.

A suitable elastomeric composition curing into a tough resilient long wearing sole under room temperature and pressure conditions is formulated in separate A and B components in parts by weight as follows:

B Component 500 pounds formrez L 46–63 urethane polyester resin blend—Witco Chemical Co.
60 pounds ethylene glycol—Nova Chemical Co.
225 grams water
17.5 pounds Freon—Nova Chemical Co.
513 grams Dabco LV-33 Catalyst—E. F. Whitmore & Co.
513 grams TMBDA Catalyst—Union Carbide Co.
513 grams L 5303 silicone surfactant—Union Carbide Co.
513 grams SF 1153 silicone surfactant—Quad Chemical Co.

A component

Softening agent—Isonate 226—an isocynate compound—Upjohn Co.

The B components are blended together in equal parts by weight in known manner and then interblended with the A component as they are about to be charged into the mold cavity. The mold parts are then assembled and the elastomer is allowed to cure. After a short period, such as five to ten minutes, the elastomer has set sufficiently to retain its shape and the female mold may be withdrawn and recharged if desired while the footwear remains assembled to the male mold for further curing. Accordingly a smaller number of female molds than male molds suffices.

After sole 34 has cured the mold parts are separated and the completed article of footwear shown in FIG. 7 is removed. The only finishing operation required is trimming away the portions of bands 27 which are not embedded in the sole. The highly elastic upper readily accommodates shoes of a limited range of sizes. For this reason a limited number of mold assemblies of different sizes provides footwear covering a wide range of shoe sizes. Accordingly the invention not only utilises exceedingly simple and inexpensive molds but a few sizes of these are adequate to provide a full line of shoe sizes.

While the particular method of making footwear herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A method of making footwear having an elastomeric sole molded at room temperature and pressure to an elastic fabric upper, said method comprising:
   assembling one lateral edge of a stretched loop of elastic fabric over a male footwear mold member with said one edge curled inwardly toward the molding face of said mold member;
   encircling the shank portion of said male mold member with elastic bands to curl the adjacent edges of said fabric toward the opposite faces of said male mold member;
   placing a charge of uncured elastomeric composition compounded to cure at room temperature and pressure in the female mold member having resilient sidewalls; and
   inserting said male mold member encircled with said fabric loop a predetermined distance into said female mold while said elastomeric composition cures.

2. A method of making footwear as defined in claim 1 characterized in the step of providing the molding face of said male mold member with a plurality of pointed pins near the perimeter thereof over which the curled edge of said fabric is impaled.

3. A method of making footwear as defined in claim 2 characterized in the step of making at least some of said pins long enough to limit the insertion of said male mold member into said female mold.

4. A method of making footwear as defined in claim 1 characterized in the step of providing the opposite end portions of the molding face of said male mold member with bosses to form outwardly facing recesses on the inner side of the sole to accommodate the spikes of athletic shoes when said footwear is worn thereover.

5. A method of making footwear as defined in claim 1 characterized in the step of providing the molding face of said male mold member with boss means along the lateral edge portions of said shank portion to seat the juxtaposed portions of said elastic band means to prevent said band means from compressing the curled edge of said elastic fabric against the molding face of said male mold member.

6. A method of making an article of footwear having an elastomeric sole molded under room temperature and pressure conditions comprising:

stretching and assembling an endless loop of elastic fabric sized to form a low height upper about a male mold member with one lateral edge of said loop curled inwardly toward the molding face of said mold member;

engaging the inwardly curled edge of said fabric over pointed rigid anchor means projecting from the molding face of said male mold member;

encircling the shank portion of said male mold member and the juxtaposed portion of said fabric loop with elastic band means to hold said fabric loop compressed against the sides of the male mold member; and inserting said male mold member and attached fabric loop into a female mold containing a charge of uncured liquid elastomeric composition compounded to cure at room temperature and pressure which female member has upstanding resilient side walls shaped and sized to receive said male mold member and hold said fabric loop compressed against the peripheral edges of said male mold member while said elastomeric composition cures to form an outsole bonded and inseparably interlocked to the inwardly curled edge of said fabric loop.

7. That method defined in claim 6 characterized in the step of utilizing a male mold member the molding face of which is shaped to form recesses on the interior surface of the footwear sole positioned to receive projections protruding from the outer surfaces of the sole and heel of athletic type footwear.

8. That method defined in claim 6 characterized in the step of utilizing an elastic fabric loop having an exposed width providing a low-height elastic upper for snugly gripping the upper of another article of footwear inserted thereinto.

9. That method defined in claim 6 characterized in the steps of cutting off the exposed portions of said elastic band means after said mold members have been separated.

10. That method defined in claim 6 characterized in the step of shaping said female mold member with a groove along perimeter portions of its cavity thereby to provide a low-height bead extending along the edge of said outsole.

11. The method defined in claim 6 characterized in the step of providing the molding face of said male mold member with boss means projecting outwardly therefrom adjacent the opposite edges of the shank portion of said male mold member, and utilizing said boss means to support said elastic band means in position to curl the adjacent edges of said fabric loop inwardly toward but spaced from the molding face of said male mold member thereby to assure that said curled edges are embedded in said elastomeric composition.

12. The method defined in claim 6 characterized in the step of utilizing rigid anchor means for the inwardly curled edges of said fabric loops at least some of which are sufficiently long to support the molding face of said male mold member a predetermined distance from the opposed molding face of said female mold member.

* * * * *